March 14, 1961 S. J. LOSKA, JR 2,974,524
METHODS AND APPARATUS FOR TESTING CONSISTENCY
Filed Nov. 23, 1956
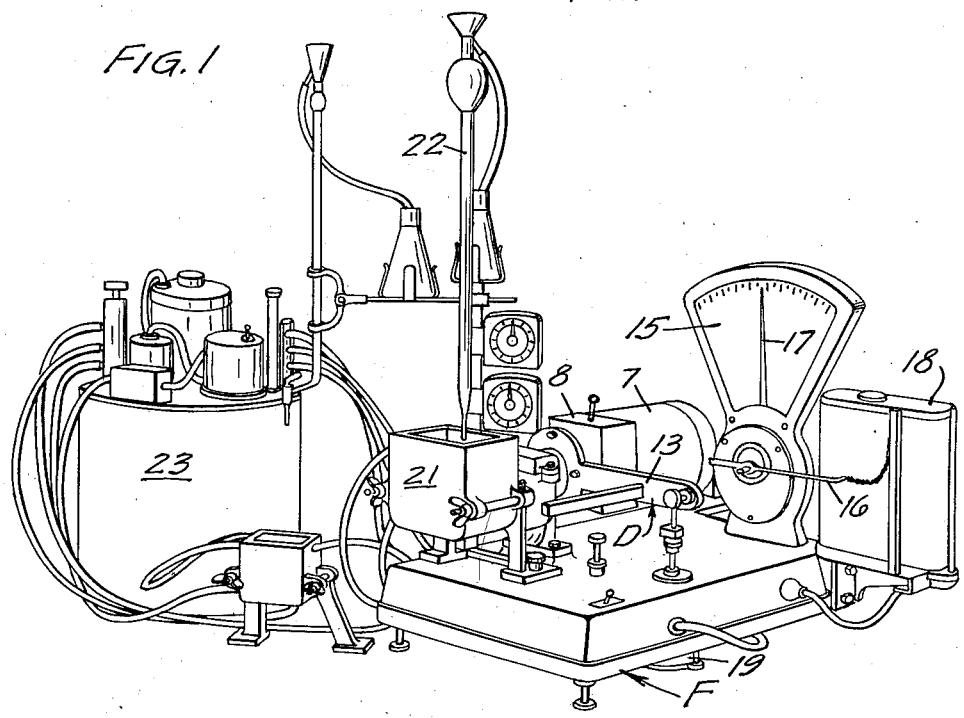
FIG. 1
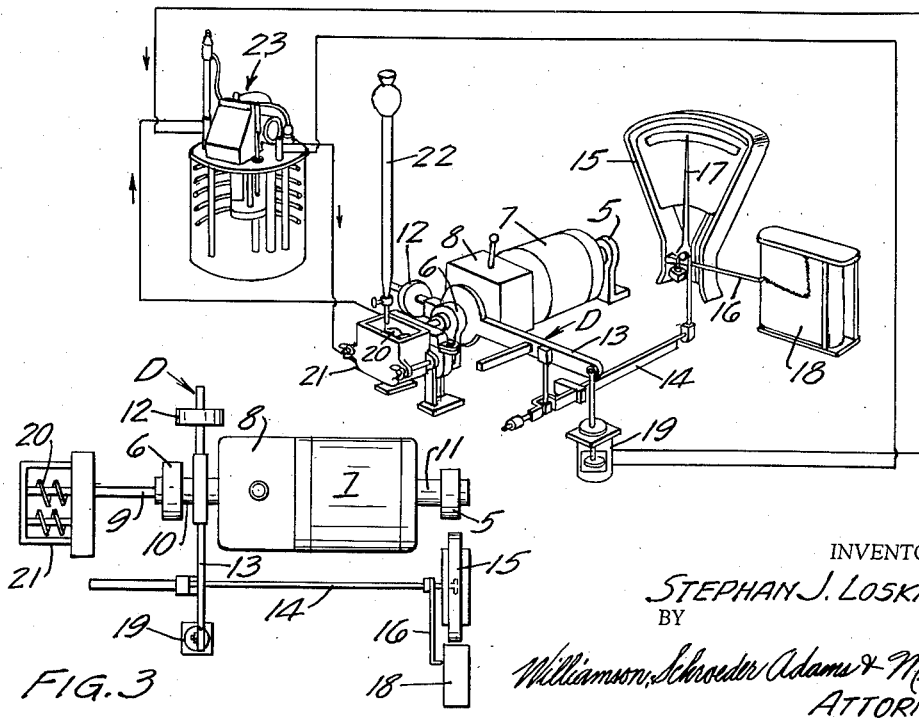
FIG. 2
FIG. 3
INVENTOR.
STEPHAN J. LOSKA, JR.
BY
Williamson, Schroeder, Adams & Meyers
ATTORNEYS United States Patent Office 2,974,524
Patented Mar. 14, 1961

2,974,524
METHODS AND APPARATUS FOR TESTING CONSISTENCY

Stephen Joseph Loska, Jr., Minneapolis, Minn., assignor to The Pillsbury Company, a corporation of Delaware Filed Nov. 23, 1956, Ser. No. 623,911

9 Claims. (Cl. 73—169)

This invention relates to consistency testers. More particularly it relates to methods and devices for testing the consistency of materials such as flour, and permitting quick and ready comparison thereof with other such materials.

It is a general object of my invention to provide novel and improved methods and apparatus for testing and recording the consistency of materials such as flour.

A more specific object is to provide novel and improved methods and apparatus for testing the consistency of materials such as flour in substantially less time than has heretofore been possible with methods and apparatus previously used.

Another object is to provide novel and improved methods and apparatus for testing the consistency of materials such as flour which will provide results equally as reliable as methods and apparatus heretofore used in approximately one half the time previously required.

Another object is to provide novel and improved methods and apparatus for testing the consistency of materials such as flour which will provide results more revealing as to certain characteristics than would be provided through the use of methods and apparatus previously known.

Another object is to provide novel and improved methods and apparatus for testing the consistency of materials such as flour which are sufficiently rapid to permit their use in a practical manner in the purchasing of grain to determine whether the grain is of a variety, the flour from which requires a long or short mixing period.

Another object is to provide novel and improved methods and apparatus for testing the consistency of materials such as flour, which are sufficiently rapid to permit their use in a practical manner by millers to distinguish grain as to long, short or medium mixing types.

Another object is to provide novel and improved methods and apparatus for testing the consistency of materials such as flour, which are sufficiently rapid to facilitate and improve quality control in milling and mixing of flours.

These and other objects and advantages of my invention will more fully appear from the following description, made in connection with the accompanying drawings, wherein like reference characters refer to the same or similar parts throughout the several views, and in which:

Fig. 1 is a perspective view of a Farinograph modified in accordance with my invention;

Fig. 2 is a schematic exploded view in perspective of a Farinograph modified in accordance with my invention; and Fig. 3 is a diagrammatic plan view of the device illustrating the structure of the dynamometer and its relation to the mixing elements.

Over the years in the flour industry, it has become apparent that there is a distinct need for a better method and apparatus for testing the consistency of flour. It has been found that a particular method of determining the consistency of flour is quite informative and is capable of interpretation so as to yield valuable data on various characteristics of the flour being tested. The apparatus used is known as a Farinograph and the data provided thereby is gleaned from a record inscribed upon a chart carried by the apparatus and referred to as a Farinogram.

The Farinogram is a time-torque chart showing the consistency curve of a particular flour when just enough water is added to a sample thereof so that the maximum consistency thereof is 500 meter-grams-torque. The use of this type of chart in the testing and evaluation of flour has become standard throughout the milling industry and has been used uniformly for over a quarter century. The 500 meter-gram-torque level is a consistency value arbitrarily selected and it is frequently referred to as 500 Brabender units, in view of the large influence which Mr. C. W. Brabender has exerted on these testing procedures. By producing a consistency curve (known as a Brabender curve) for a given flour and comparing it to curves of flours of known characteristics, it has been possible to accurately determine and compare the characteristics of the given flour of previously unknown characteristics.

The most valuable criteria determinable from the use of the Farinograph is the characteristic referred to as "peak time." The "peak time" of a flour is a measure of the time it takes for that flour to reach its maximum consistency when just enough water is added thereto so that its maximum consistency is 500 meter-grams-torque or 500 Brabender units. Some flours reach this more rapidly than others, and it is important to millers and bakers alike, to know what this peak time is. It is important to the baker that he know the peak time for he wants to develop his dough to maximum consistency but not past that point, else the dough will be wet and sticky, and will not machine properly because of such overmixing. It is also important to a baker that he know that the flour which he is purchasing is uniform in this respect, for he can then establish set baking procedures which may be followed daily to produce optimum baking results.

It should be noted that many strong wheat flours such as spring wheat flour produce curves (Farinograms) which are extremely flat in appearance. This makes it difficult to evaluate the "peak time" of the flour by use of the Farinograph.

Another criteria of flour determinable from the use of the Farinograph is the characteristic referred to as "valorimeter values" or, in other words, the ability of the flour to withstand kneading or mixing before its consistency commences to break down rapidly. This is evaluated by again selecting an arbitrary value, in this instance a given time period (12 minutes) after the flour reaches its maximum consistency, and measuring the combined peak time and drop in consistnecy over that period and comparing it to other flours. This method of interpretation has also been standard in the flour industry for over a quarter century.

Another criteria of flours determinable from the use of the Farinograph is the characteristic of absorption. It is important to both the miller and the baker to know how much water a given weight of flour can absorb in order to yield a dough of maximum consistency. Also, a flour having a relatively high ability to absorb water is desirable from a baker's viewpoint and hence a means for quickly determining this characteristic is very desirable. Under use of standard Farinograph methods, however, it is often impossible to distinguish between flours having relatively close absorption characteristics because they appear on the chart to be the same.

The big disadvantage of the Farinograph methods of testing flour is the length of time required to accurately run tests on a given flour of unknown characteristics. Because of the time involved, these methods are entirely unsatisfactory for guidance in the purchasing of wheat because the results cannot be obtained within the time limits of modern purchasing practices. Their value with respect to quality control and experimental work is also substantially reduced by this time factor. My invention is directed toward overcoming this serious handicap by providing methods which require substantially less time but will nevertheless not require throwing away the knowledge which has been gained over the years through the use of the "Brabender curve" and will not require the setting up of an entirely new system of standards. In addition, my invention is directed toward providing data which is even more illuminating as to certain characteristics than has previously been available through the standard Farinograph methods.

I have discovered that although the consistency in wheat flours varies as the shear rate is increased, this variance is sufficiently consistent that it may be predicted through the use of an equation. Moreover, I have discovered, although approximately ten percent of wheat flours have a peak time which varies considerably as the shear rate is increased, that generally speaking, the consistency of wheat is substantially a linear function of the increase in shear rate. Because of the proximity of the consistencies of wheat flours, in general, to such a linear function, I have discovered that for practical purposes a set formula or equation may be used to enable one skilled in the art to conduct consistency tests in substantially less time without introducing errors greater in magnitude than those normally encountered in the manufacture and operation of the equipment utilized in conducting the standard tests to obtain the "Brabender curves." These formulas or equations are as follows: $Y=2.57R+343$ and $$A=\left(\frac{R}{62}\right)^{+1.2}$$

where Y is the consistency of the sample and R is the r.p.m. value of the mixing element and A is the chart speed expressed in centimeters per minute. I have discovered that if a standard Farinograph is adjusted in accordance with the above equations, its mixing element may be operated at a speed within the range of 80–150 r.p.m. and yet yield accurate results and will produce the same "Brabender curve" as the same system of flour would produce if tested with standard Farinograph apparatus and methods, provided that the scale of the Farinograph is so adjusted that it will actually read 500 meter-grams-torque when it is subjected to a meter-grams-torque equal to the value of Y in the above equation.

The r.p.m. value of the mixing element which I prefer in testing the consistency of flours is 110 r.p.m. The standard shear rate value of a Farinograph is 62 r.p.m., but it can be seen, by reference to the above equations, that if the r.p.m. value is stepped up to 110 r.p.m., then the chart speed may be doubled. At 110 r.p.m. the same flour system which would yield 500 meter-grams-torque in the standard Farinograph, will yield 620 meter-grams-torque and hence the scale of the Farinograph must be adjusted so that when 620 meter-grams-torque are exerted thereon, it will read 500 meter-grams-torque. I have discovered that when this has been done, the same flour system will yield the same peak time and the slight distortion amplifies the true peak time which is difficult to see under normal Farinograph testing methodology. It should also be noted that this amplification of true mixing time is done without changing the concentration of the dough i.e. absorption which in the art of baking is near the empirically established 500 Brabender unit value of torque at 60 to 62 r.p.m.

The standard speed for the torque time chart on a Farinograph is one centimeter per minute. The speed of this chart is increased, therefore, to two centimeters per minute when the r.p.m. of the mixing element is increased to 110 r.p.m. It will be noted from this that the chart speed is not increased exactly proportionally to the increase of the r.p.m. but it is increased substantially proportionally to the degree of increase in the r.p.m.

If a different r.p.m. value of the mixing element is desired to be used, it may be accomplished with equally satisfactory results between the range of 80–150 r.p.m.'s by varying the chart rate in accordance with the above equation of $$A=\left(\frac{R}{62}\right)^{+1.2}$$

and by adjusting the scale of the Farinograph scale in accordance with the above equation of $Y=2.57R+343$. After such adjustments have been made, the machine will render a "Brabender curve" equally valuble and even more so, for interpretation of the characteristics of the flour systems and interpretable through the use of standard Farinograph interpretive processes. The resulting curve will be essentially the same curve as would be obtained by testing the same flour system under standard Farinograph methods.

Figs. 1–3 illustrate a Farinograph modified in accordance with my invention and capable of utilization in the practice of the methods disclosed and claimed herein. As shown, it may include a frame indicated generally as F having mounted thereupon in a pair of bearings 5 and 6 a motor or source of power 7 and a variable speed gear box 8. The bearings 5 and 6 rotatably support the motor 7 and variable speed gear box 8 for oscillation about the longitudinal axis of its driving shaft 9. It will be noted that the driving shaft extends outwardly through the axis of the supporting shaft 10 of the motor and that a second supporting shaft 11 supports the motor 7 within the bearing 5 so that the motor may oscillate when a torque is applied thereto.

Connected to the motor 7 is a dynamometer indicated generally as D. This dynamometer includes a counter weight 12 which balances out the resistance due to bearings, gears, etc., when the machine is running so that only the consistency of the dough is measured. It also includes a lever 13 which extends laterally from the gear box and is connected by a linkage 14 to a scale element 15 which in turn is connected to a pen 16 which records the extent of movement of the indicator 17 of the scale 15 upon a time chart 18. The lever 13 is connected with an oil damping device 19 which controls the amount of oscillation of the motor 7 and gear box 8.

The mixing element 20 is disposed as shown within a mixing bowl 21 into which the flour samples are placed. Arranged immediately above the mixing bowl 21 is a burrette 22 for the addition of the necessary amount of water to the sample. A circulating pressure thermostat indicated generally as 23 maintains constant temperature inside the jacketed mixing bowl 21. All of the structure defined above will normally be found in a standard Farinograph used conventionally in testing the consistency of flour with the exception of the variable speed gear box 8 which is included herein for the purpose of making it possible to utilize the apparatus while driving the mixing element 20 at the various r.p.m.'s within the range stipulated.

In the practice of the methods disclosed and claimed herein, the Farinograph apparatus shown must be adjusted in accordance with the foregoing material and as defined hereinafter. As stated above, I prefer to set the variable gear box 8 so that the mixing element will be driven at 110 r.p.m. When a speed of 110 r.p.m. of the mixing element is utilized, the time chart 8 can have its speed increased to twice its normal speed, or in other words, to a speed of two centimeters per minute instead of the conventional one centimeter per minute. I then adjust the scale element of the scale 15 so that when 620 meter-grams-torque are exerted upon the dynamometer D, the scale will indicate only 500 meter-grams-torque. When these three adjustments have been made, the device shown in Figs. 1–3 is ready for use at the speed indicated. It will be readily appreciated, of course, that a different r.p.m. value may be selected so long as the chart speed is adjusted in accordance with the equation $$A = \left(\frac{R}{62}\right)^{+1.2}$$

where A is the speed of the time chart in centimeters per minute and R is the shear rate of the mixing element expressed in revolutions per minute and so long as the scale element is adjusted so as to read 500 meter-grams-torque when the actual torque exerted thereupon is equal to the value of Y in the equation $Y = 2.57R + 343$ where Y is the torque expressed in meter-grams-torque and R is the shear rate of the mixing element expressed in revolutions per minute. If these adjustments are so made, the consistency curve which is arrived at by testing a system of flour will be interpretable by the utilization of standard Farinograph interpretive processes.

In testing the consistency of a system of flour, a sample thereof is selected and approximation is made of the amount of water which will yield a reading of 500 meter-grams-torque maximum consistency on the scale element. A test run is then made and additional test runs follow until the amount of water needed to yield an indicated maximum consistency of 500 meter-grams-torque is determined. After the exact amount of water has been determined, a complete test is run with that amount of water being added to the sample and thereafter the consistency curve which is produced as a result of that test upon the time chart 18 may be interpreted by comparison with known systems of flour. It is understood, of course, that the time chart has time as one of its coordinates and torque as its other coordinate.

It will be readily appreciated that through the use of these methods the amount of time required to yield a satisfactory consistency curve is substantially reduced. For example, the time required for obtaining such a consistency curve is cut to approximately one half that required by standard Farinograph methods.

I have found that when the consistency curve is determined at a more rapid rate as disclosed and claimed herein the curve which is yielded tends to magnify disparities in different flour systems as to their water absorption characteristics. For example, a flour system which has a relatively high moisture absorption value will appear even higher on a consistency curve arrived at by practicing these more rapid methods and a flour system having a relatively low absorption characteristic will have that characteristic magnified upon a similar consistency curve. As a result, many flours which are indistinguishable when standard Farinograph methods are utilized are readily distinguishable when these more rapid methods are used. In addition, the peak is magnified and accentuated and hence more readily discernible on spring wheat flours which have slow breaking down characteristics.

From the above, it can be readily seen that I have provided novel methods and apparatus which constitute a valuable aid for wheat purchasers because such a device enables a purchaser to determine the value of wheat more accurately since it can be accomplished within the time limits of modern purchasing practices. Standard Farinogram methods are entirely unsuited as a buyer's aid in the purchasing of wheat because they cannot be practiced within these time limits.

It will also be seen that my methods make this device of greater value for use in quality control and experimental uses. These methods enable a miller to quickly distinguish one flour from another as to their mixing qualities. A miller manufactures flour having long, short and medium mixing time characteristics and it is important from a standpoint of quality control that he be able to quickly distinguish one from the other.

The baker on the other hand, demands insofar as is possible that he receive flour from day to day which is uniform in its mixing time. This is imperative from the baker's viewpoint in order that he can establish set baking procedures which will yield optimum results. Through the use of my methods it is possible to more accurately control the uniformity of flours which will be sold to the bakers. It is also important to the baker because he wants to develop his dough to maximum consistency but not beyond that point, and therefore, the more uniform flour he receives, the more effectively can he develop his baking procedures to an accurate science.

It will, of course, be understood that various changes may be made in the form, details, arrangement and proportions of the parts without departing from the scope of my invention which consists of the matter shown and described herein and set forth in the appended claims.

What is claimed is:

1. The method of reducing the time required to determine the peak time in testing and recording the consistency of flour consisting in, placing a sample of the flour within a mixing bowl having a rotary mixing element therewithin, rotating the mixing element at 110 r.p.m. while adding sufficient water to said sample to cause it to reach its maximum consistency, and producing upon a time-torque chart operated at about a speed of 2 centimeters per minute, an erroneous indication of the torque resistance exerted by the flour and water mixture upon the mixing element, said indication on the chart erroneously indicating 500 meter-grams-torque being exerted by the flour and water mixture when actually approximately 620 meter-grams-torque are being exerted thereby and erroneously indicating all other torques proportionately, whereby a curve which is comparable to the well known Brabender curve will be produced on the time-torque chart.

2. The method of reducing the time required to determine the peak time in testing and recording the consistency of flour consisting in, placing a sample of the flour within a mixing bowl having a rotary mixing element therewithin, rotating the mixing element at 110 r.p.m.'s while adding a predetermined amount of water to said sample sufficient to cause said sample to reach its maximum consistency, and producing upon a time-torque chart operated at a speed of approximately 2 centimeters per minute, a line indicating a distorted value of the torque resistance exerted by the flour and water mixture upon the mixing element, the values of the torque resistance of this line being distorted so that when approximately 620 meter-grams-torque is exerted by the mixture it will be shown on the chart as 500 meter-grams-torque and so that all other torque values will be shown distorted proportionately, whereby a curve which is comparable to the well known Brabender curve will be produced on the time-torque chart.

3. The method of reducing the time required to determine the peak time in testing and recording the consistency of flour consisting in, placing a sample of flour within a mixing bowl having a rotary mixing device therewithin, rotating the mixing device at a constant speed within the range of 100–150 r.p.m. while adding sufficient water to said sample to cause said sample to reach its maximum consistency when mixed therewith, and producing upon a time-torque chart operated at a speed of about 2 centimeters per minute, an erroneous indication of the torque resistance exerted by the sample of flour and water mixture upon the mixing device, said indication on the chart erroneously indicating 500 meter-grams-torque at maximum consistency of the mixture regardless of the actual torque exerted by the sample of mixture on the mixing device and erroneously indicating all other torques proportionately, whereby a curve which is comparable to the well known Barbender curve is produced on the time-torque chart.

4. The method of reducing the elapsed time required in determining the peak time in testing and recording the consistency of flour consisting in, placing a sample of the flour within a mixing bowl having a rotary mixing device therewithin, rotating the mixing device at approximately 110 r.p.m. while adding only sufficient water to said sample to cause said sample to reach its maximum consistency, and producing upon a chart having time as one of its coordinates and meter-grams-torque as its other coordinate and moving at a speed of approximately 2 centimeters per minute, a line indication of the torque resistance exerted by the flour and water mixture upon the rotating device, said line indication on the chart erroneously indicating approximately 620 meter-grams-torque exerted on the mixing device as about 500 meter-grams-torque and erroneously indicating all other torques proportionately, whereby a curve which is comparable to the well known Brabender curve is produced on the time-torque chart.

5. The method of reducing the time required to determine the peak time in testing and recording the consistency of flour consisting in, placing a sample of the flour within a mixing bowl having a rotary mixing element therewithin, adding sufficient water to the sample to give a maximum consistency of 620 meter-grams-torque, rotating the mixing element at 110 r.p.m. while adding this water to said sample, and producing upon a time-torque chart operated at a speed of 2 centimeters per minute, an indication of the torque resistance exerted by the flour and water mixture upon the mixing element, said indication indicating a distorted value of the torque resistance exerted by the mixture to the extent that a sample which would yield a 620 meter-grams-torque will be indicated as 500 meter-grams-torque and all other values will be distorted proportionately, whereby a curve which is comparable to the well known Brabender curve will be produced on the time-torque chart.

6. In a consistency tester, a mixing bowl member adapted to receive flour and water therewithin, a source of rotary power, a rotary mixing element mounted for rotation within said bowl member and geared to said source of rotary power for rotation thereby at such a ratio as to cause said mixing element to rotate at approximately 110 r.p.m., a torque-measuring dynamometer connected to said source of power in torque-measuring relation and adjusted to indicate 500 meter-grams-torque while being subjected to 620 meter-grams-torque, a time-torque chart-bearing recording mechanism connected to said dynamometer in torque-recording relation, and means connected to said recording mechanism and geared to move said time-chart at approximately a speed of two centimeters per minute whereby the consistency of a particular sample of flour may be determined in substantially less time.

7. In a consistency tester, a mixing bowl member adapted to receive flour and water therewithin, a source of rotary power, a rotary mixing element mounted for rotation within said bowl member and geared to said source of rotary power for rotation thereby at such a gear ratio as to cause said mixing element to rotate at a speed within a range of 80–150 r.p.m.'s, a torque measuring dynamometer connected to said source of power in torque-measuring relation and adjusted to read 500 meter-grams-torque at an actual consistency of Y meter-grams-torque and to read all other values proportionately and wherein Y is determined in accordance with the equation $Y=2.57R+343$ where R is the r.p.m. value of said mixing element, a time-torque chart-bearing recording mechanism connected to said dynamometer in torque-recording relation, and means connected to said recording mechanism and geared to said time chart at a ratio to cause said time chart to move at a speed increased over a speed of one centimeter per second approximately proportional to the increase in the r.p.m.'s of the mixing element over 62 r.p.m. whereby the peak time of a sample will be attained in substantially less time.

8. In a consistency tester, a mixing bowl member adapted to receive flour and water therewithin, a source of rotary power, a rotary mixing element mounted for rotation within said bowl member and geared to said source of rotary power for rotation thereby at such a ratio as to cause said mixing element to rotate at a speed within a range of 80–150 r.p.m.'s, a torque measuring dynamometer connected to said source of power in torque-measuring relation and adjusted to read a consistency of 500 meter-grams-torque at an actual consistency of Y meter-grams-torque and to read all other values proportionately and wherein Y is determined in accordance with the equation $Y=2.57R+343$ where R is the speed of rotation of said mixing element in revolutions per minute, a time-torque chart-bearing recording mechanism connected to said dynamometer in torque-recording relation, and chart-moving means connected to said recording mechanism and geared to said time chart of said mechanism at such a ratio as to cause said time chart to move at a speed determinable from the equation $$A=\left(\frac{R}{62}\right)^{+1.2}$$

where R is the speed of rotation of said mixing element in revolutions per minute and A is the chart speed expressed in centimeters per second whereby the peak time of a sample of material the consistency of which is to be tested may be attained in substantially less time.

9. The method of reducing the time required to determine the peak time in testing and recording the consistency of flour consisting in, placing a sample of the flour within a mixing bowl having a rotary mixing device therewithin, rotating the mixing device at a constant speed within the range of 80–150 r.p.m. while adding only sufficient water to said sample to cause said sample to reach its maximum consistency when mixed therewith, and producing upon a time-torque chart operated at a speed determinable from the equation $$A=\left(\frac{R}{62}\right)^{+1.2}$$

where A is the speed of the chart expressed in centimeters per minute and R is the r.p.m. at which said mixing device is being rotated, an indication of the torque resistance exerted by the flour and water mixture upon the mixing device, said indication indicating the values of the measured torque in accordance with the equation $$Y=2.57R+343$$

where Y is the consistency of the sample in meter-grams-torque and R is the r.p.m. value of the mixing device whereby the peak time of the sample will be attained at an elapsed time substantially less than the normal testing time.

References Cited in the file of this patent

UNITED STATES PATENTS 529,175    Hogarth _____ Nov. 13, 1894

OTHER REFERENCES

Baking Science and Technology by E. J. Pyler, vol. II, pages 511–516, 1952, published by Siebel Publishing Co., Chicago, Illinois.